(12) United States Patent
Tytar

(10) Patent No.: US 7,946,445 B2
(45) Date of Patent: May 24, 2011

(54) MULTIPLE-USE TWO-RESERVOIR BUCKET

(76) Inventor: Frank A. Tytar, New Hudson, MI (US)

( * ) Notice: Subject to any disclaimer, the term of this patent is extended or adjusted under 35 U.S.C. 154(b) by 711 days.

(21) Appl. No.: 11/786,112

(22) Filed: Apr. 11, 2007

(65) Prior Publication Data

US 2007/0241049 A1    Oct. 18, 2007

Related U.S. Application Data

(60) Provisional application No. 60/792,735, filed on Apr. 18, 2006.

(51) Int. Cl.
*B65D 1/24* (2006.01)
*B65D 25/04* (2006.01)

(52) U.S. Cl. .................................. 220/501; 220/532

(58) Field of Classification Search ............... 220/501, 220/529, 532, 770; 210/455; 15/260
See application file for complete search history.

(56) References Cited

U.S. PATENT DOCUMENTS

| | | | | |
|---|---|---|---|---|
| 1,486,284 A * | 3/1924 | Eiffe | ................................ | 15/261 |
| 3,811,597 A * | 5/1974 | Frankenberg et al. | ......... | 220/284 |
| D286,096 S * | 10/1986 | Jaros et al. | .................. | D32/53.1 |
| 6,279,195 B1 * | 8/2001 | Biggs | .............................. | 15/261 |
| 6,736,969 B2 * | 5/2004 | Milne | ............................. | 210/232 |
| 7,207,457 B2 * | 4/2007 | Schwarz | ........................ | 220/276 |
| 2002/0096525 A1 * | 7/2002 | Bertoldo et al. | .............. | 220/544 |

* cited by examiner

*Primary Examiner* — Anthony Stashick
*Assistant Examiner* — Harry A Grosso

(57) ABSTRACT

A two-reservoir bucket comprised of conjoint reservoirs with sidewalls intersecting to form a narrow channel between the two reservoirs and an integral or removable divider with passageway(s) positioned in the channel to divide the reservoirs.

3 Claims, 15 Drawing Sheets

MULTIPLE-USE TWO-RESERVOIR BUCKET

CROSS-REFERENCE TO RELATED APPLICATION

Figure 1:
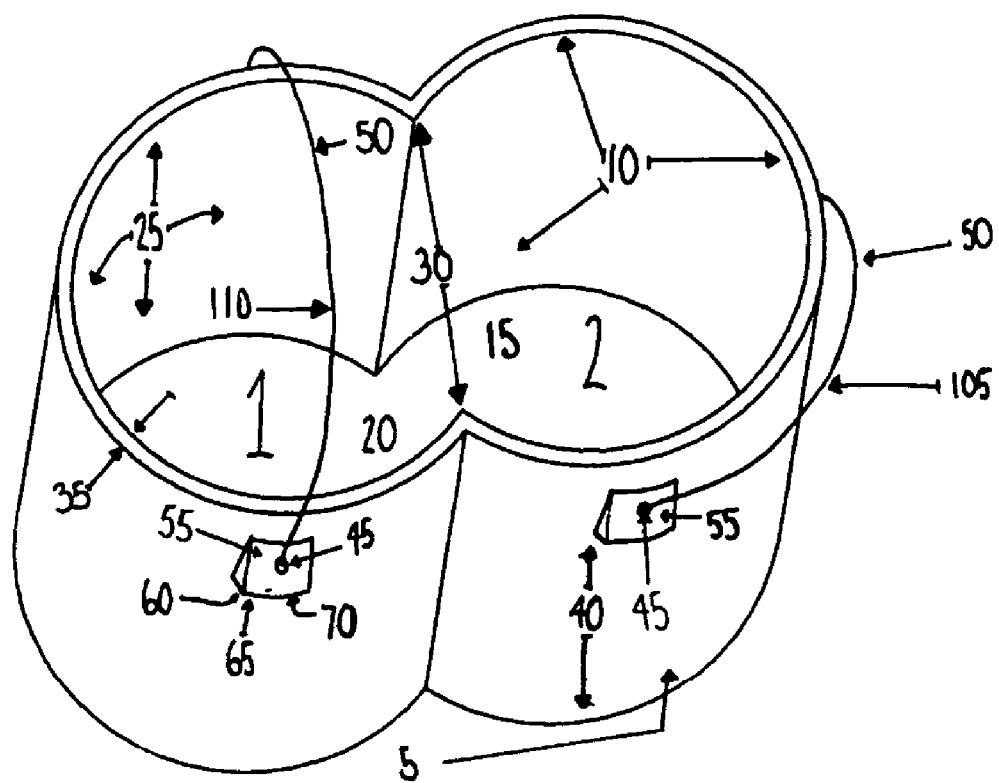

This application claims the benefits of U.S. provisional patent application No. 60/792,735 filed on Apr. 18, 2006.

STATEMENTS REGARDING FEDERALLY SPONSORED RESEARCH OR DEVELOPMENT

N/A

BACKGROUND OF THE INVENTION

1. Field of the Invention

This multi-use two-reservoir bucket relates to equipment and tools used by painters, tradesmen, homeowners, businesses, companies, corporations, and various other individuals. This invention's two reservoirs are made to combine various separate tasks and methods for tools and accessories. More specifically, the multi-use two-reservoir bucket is a two-reservoir system to supply liquid or material to a pump/sprayer.

2. Description of the Related Art

Any discussion of the prior art throughout the specification should in no way be considered as an admission that such prior art is widely known or forms part of common general knowledge in the field.

All prior art methods and tasks are associated for or designed around a one-reservoir system such as containers, cans or five gallon buckets comprising of only one reservoir therefore limiting options and tasks. One objective of the multi-use two-reservoir bucket's two reservoirs is to make readily available a variety of more options and combine uses that are otherwise separately limited to prior art.

The typical way of supplying a pump/sprayer with liquid or material is a one-reservoir system such as a container or a five gallon bucket with a pump inserted. When you refill the pump is in the way and, even with a slow pour that is hard on the user, there is a chance of spilling liquid or material on the pump. One objective of the multi-use two-reservoir bucket is to use a two-reservoir system that when refilling, the pump in reservoir two is completely out of the way while filling reservoir one.

Pump/sprayers are susceptible to clogging due to small and large apertures such as dirt, not disbursed pigment, undissolved mix or resin and need to be filtered immediately prior to use. As with any liquid or material, filtering to remove impurities before disbursement is imperative to avoid having an inferior product and productivity. The conventional way to filter impurities from liquid or material is to use an empty container, put a net straining screen in, grab another full container, pour entire contents of liquid or material through a straining screen into the empty container, and then reach your hand inside and scrape the emptied container clean. Finally, you set the container down, grab the straining screen, ring it out by hand, place the straining screen into another empty container and so on for as much material as needed. After this process, you can fill or refill the one-reservoir system to your pump. The problem associated with this method is that before you can use the liquid or material for disbursement, you have to filter all the containers separately and then continuously ring out and remove the straining screen for each container. With the multi-use two-reservoir bucket, divider, and using a straining screen in reservoir one, it solves the problem of removing and ringing out the straining screen, thus eliminating the mess. When using the multi-use two-reservoir bucket, the divider, and a straining screen you pour liquid or material into reservoir one and the liquid or material feeds through a straining screen and divider. The filtered liquid or material passes through into reservoir two for disbursement, never having to remove the straining screen and never having to prepare any liquid or material by filtering all containers before use, thus saving time. Another typical way to filter impurities from liquid or material is to use a cap insert that sits horizontally on the rim of a container with a mesh screen inside. It has an opening to insert a pump/sprayer through so you can filter liquid or material while filling and is designed for the one-reservoir system. The problem associated with this method is that liquid or material dropping through the screen mesh is very slow. After the first use and before the second use, in most cases, the plurality of holes in the screen start to clog from air-dried liquid or material because it is suspended at the top of the container. Using the multi-use two-reservoir bucket, the divider, and a straining screen solves these problems because the straining screen almost always stays submerged. The liquid or material passes through faster because vertically there is more mesh screen over a greater opening. A lot of users don't filter liquid or material before use because it is just too inefficient, time consuming, and messy. In the long run, the pumps wear out prematurely because impurities tear up the packing and the piston, which is a costly repair. The conventional way of using a one-reservoir system of supplying a pump/sprayer with filtered liquid or material is inefficient, messy, and time consuming. To resolve these problems, it is therefore, another objective of the multi-use two-reservoir bucket to have a pump/sprayer in the second reservoir when liquid or material is poured into reservoir one, or being disbursed from reservoir two, it is gravity fed through a straining screen and divider into the second reservoir continuously supplying the pump/sprayer with impurity free liquid or material. Using the multi-use two-reservoir bucket, divider and straining screen to filter liquid or material for a pump/sprayer provides a highly efficient, easier, faster, and cleaner method that eliminates all time consuming and messy preparation, but most importantly, saves a pump/sprayer from excessive wear and tear.

Another objective of the multi-use two-reservoir bucket is to save a pump/sprayer from severe wear and tear, because the two-reservoir system carries more volume compared to the typical one-reservoir system. With two reservoirs, a pump/sprayer can run up to twice as long without refilling and supply up to two times the liquid or material. Refilling half as much on the overall job is half as likely to run the pump/sprayer out of supply, which causes severe wear on packings and the piston. Also, every time the pump/sprayer is primed again because it is out of supply, purging air from the system is hard wear and tear on the pressure switch. Running your pump/sprayer longer without refilling means higher efficiency for labor and timing on the overall job with less machine maintenance.

With all liquid or material, not blending properly will end up with an inconsistent, inferior product that is not uniform. The common way to blend and/or filter liquid or material together making sure to have the same consistency is to start off with two or more containers of liquid or material and an empty container, filtering all material as described in prior art [0005]. Next, leave a container half full and pour half of the next container in and continue blending half containers at a time until all containers are well blended, usually going through this sequence 3 or 4 times over. It is a messy system to use, it is time consuming, and costly. It is extremely inefficient each time liquid or material is poured back and forth between containers because of spillages, physical labor, labor time, getting material on persons, surrounding objects and the floor. A further objective of the multi-use two-reservoir bucket is that a container and a half of liquid or material can be poured into reservoir one, which then feeds reservoir two through a straining screen and divider. The material or liquid is blended and filtered in one sequence. With the multi-use two-reservoir bucket's volume, it makes it possible to blend one and a half containers at a time compared to a half container at a time and to blend and filter without ever removing or ringing out the screen. The other commonly used method to blend liquid or material is to pour half of a container in an empty container and pour in half of another container, then use a speed drill with a mixer attachment which usually takes longer and you have to clean the spinner when you are done. The method of blending liquid or material for disbursement and/or to filter liquid or material using the multi-use two-reservoir bucket, divider, and straining screen is faster, easier, and cleaner compared to the conventional ways of prior art.

The problem associated with a non-detachable divider is not being able to remove it for stacking and shipping. Specialty containers, cans, and buckets when shipped commonly take up a lot of volume, which is a costly freight charge, and when put on display or stored take up a lot of room. In the world today, shipping large quantities of items is almost essential for successful distribution. Therefore, the ability to collect a plurality of items into a small space for storage, shipping or displaying is highly desirable. Thus, stacking hate becomes an important consideration. Specialty containers typically cannot be stacked to reduce the space used due to specialty interior structures. Therefore, the multi-use two-reservoir bucket addresses these problems having an inward tapered region, an integral or removable divider, and a single formed two-reservoir storage area for stacking into one another and storing. This in turn reduces freight charges and maximizes shelf space at the point of consumer purchase and offers convenient storage of multiple units from the manufacture to the consumer. Another problem associated with a non-detachable divider is not being able to remove and clean it making reusability and further uses limited. Also a problem associated with most detachable dividers is liquid or material escaping between the body and the divider. To address these problems, the multi-use two-reservoir bucket's divider is adaptable and compatible to the preferred embodiment so being integral conforms into a sealed fit. Therefore, a further objective of the multi-use two-reservoir bucket's divider is to be integral or removable for storage, shipping, cleaning, reusability and/or providing more options and uses for the multi-use two-reservoir bucket that may otherwise be limited with a non-detachable divider.

The common method to supply tools, accessories, and screens with liquid or material is to use a one-reservoir system such as a container or a five gallon bucket, filtering and blending liquid or material separately before use, and also being limited to the volume of one reservoir. An objective of the multi-use two-reservoir bucket is to filter and blend in one easy step and also to supply tools, accessories, and straining screens with liquid or material for disbursement at the same time. The multi-use two-reservoir bucket's two-reservoir system supplies up to twice as much volume, filtering and blending liquid or material quickly and neatly in one sequence as described in [0005] and blends as described in [0007]. The two-reservoir system is more efficient, convenient, and easier to use than the common practices available in prior art. Using the one-reservoir system for tasks and methods is limited, therefore a further objective of the multi-use two-reservoir bucket is to combine the separate tasks and methods of the one-reservoir system by continuously filtering and supplying, blending material or liquid for disbursement, and providing more volume. The greater volume of the multi-use two-reservoir bucket reduces the frequent refills, which greatly improves efficiency. When working in certain areas, five gallon buckets or containers that hold liquid or material are employed for tools and accessories and often are set in a specific area to which tools and accessories return periodically for disbursing the liquid or material. Some examples of tools and accessories would be liquid or material applicators, roller handles, roller covers, roller grids, cleaning brushes, paint brushes, trowels pump/sprayers etc. The multi-use two-reservoir bucket provides multiple functions in one unit and reduces the need to carry additional containers.

For years, containers, cans, and five gallon buckets have commonly used one option of lifting, such as with one handle made of bail wire that pivots. Different applications in the field may require other options of comfortably and safely lifting, placing or moving the multi-use two-reservoir bucket. With the multi-use two-reservoir bucket holding more volume there is more weight, so to better stabilize the weight, a second set of recessed handles would be advantageous to the handler to prevent injuries.

For other applications, a reusable fit cover must be provided, for example, when it is desired to use only a portion of the contents in the multi-use two-reservoir bucket and then to store the partially filled reservoirs for future use. In the case of material in the granular or powder form, the reusable fit cover may have to make a secure seal, so as to prevent leaking of the contents of the multi-use two-reservoir bucket after the fit cover has been reapplied. It would also be desirable to cover any unused liquid or material for concerns of being left open. There is a further concern if the multi-use two-reservoir bucket is filled with material that is toxic or irritating to the skin and is used in or around a residence where small children are present, since their curiosity may cause them to remove a fit cover to view the contents of the multi-use two-reservoir bucket. Government regulations and industry requirements demand the use of a reusable fit cover that is adapted to make a substantially leak-proof fit with a container and is difficult for children to remove, either accidentally or purposely. From the foregoing, to address the concerns of an open container, the multi-use two-reservoir bucket would have an attachable fit cover when engaged with the rim/channel providing a leak-proof seal for safely storing liquid or material and tools.

A concern of the multi-use two-reservoir bucket is that a different liquid or material or method of use may require a compatible, integral, structural material to be used for manufacture. For instance, if using a liquid or material like muriatic, hydrochloric, sulfuric acid or latex paint, you would not want to use metal as the integral, structural material because of chemically incompatible problems. Some other examples would be xylene, denatured alcohol, or any oil-based paint products and a molded plastic as an integral, structural material because the chemicals would break down, disintegrate or mold with the plastic. Therefore, the desired liquid or material being used and/or the method of use should determine the material used to manufacture the multi-use two-reservoir bucket's body, divider, and attachable fit cover so as long as the material(s) used are integrally structural and compatible with the contents.

Another objective of the multi-use two-reservoir bucket's two reservoirs is to provide a variety of further options and methods in other fields such as agriculture, the food industry, pharmaceutical, and other industries that use and/or are limited to the uses of a one-reservoir system.

From the foregoing, to greatly improve labor, production, minimize machine maintenance, and to further options, it would be highly desirable to provide a multi-use two-reservoir bucket to combine tasks and methods that overcome the problems, difficulties, and limitations associated with prior art.

The above descriptions and examples should not be construed as limitations on the scope of the present invention. Many other variations are possible. Accordingly, the scope of the present invention is determined by the claims and their legal equivalents.

The foregoing, together with other objects, features, and advantages, will be apparent after referring to the following summary, specifications, and the accompanying drawings.

A BRIEF SUMMARY OF THE INVENTION

More Specifically

A multi-use two-reservoir bucket comprised of conjoint reservoirs, the sidewalls of each reservoir intersecting the sidewalls of the other reservoir in such a way as to provide a narrowed open channel extending from top to bottom between the two reservoirs, themselves selectively divided from each other at the open channel by an integral or removable divider with passageway(s); and, the aforesaid two-reservoir bucket further having an open top; a continuous closed bottom; a rim configuration suitable to receive a closed attachable fit cover to seal one or both reservoirs, and appropriate pivot handle supports. More over, the two-reservoirs constitute separated shapes joined at the narrowed open channel.

In Combination

The multi-use two-reservoir bucket comprising in combination: (1) of conjoint reservoirs, the sidewalls of each reservoir intersecting the sidewalls of the other reservoir in such a way as to provide a narrowed open channel extending from top to bottom between the two reservoirs, themselves selectively divided from each other at the open channel by an integral or removable divider with passageway(s); and, the aforesaid two-reservoir bucket further having an open top; a continuous closed bottom; a rim configuration suitable to receive a closed attachable fit cover to seal one or both reservoirs: appropriate pivot handle supports; and, (2) the conforming non-planar integral or removable divider provided with passageway(s) partitions the aforementioned two reservoir bucket into subsidiary reservoirs; and, (3) an attachable fit cover suitable for a closure means with the aforementioned rim configuration.

The present invention is most preferably manufactured from a plastic polymeric material such as polyethylene and polypropylene which have been shown to have highly advantageous physical characteristics including strength, durability, resistance to denting, and dimensional stability. However, for manufacturing, other compatible and structural material(s) well known to the art worker may be utilized depending on the desired liquid or material or method of use. The handles are for some embodiments filled and for other embodiments hollow.

Efficiently utilized, the multi-use two-reservoir bucket eliminates many of the heretofore objectionable problems associated with prior art and substantially departs from the conventional concepts and designs of prior art. An objective of the multi-use two-reservoir bucket is to combine separate tasks and methods that overcome the problems, difficulties, and limitations associated with prior art.

It is a particular objective of the present invention to provide a multi-use two-reservoir bucket and divider that is reusable, user friendly, but relatively inexpensive and simple to manufacture, ship and store.

It is a primary objective of the multi-use two-reservoir bucket to use reservoir one for method(s) and use reservoir two for method(s) using two reservoirs for combining methods for a pump/sprayer, straining screens, tools and accessories offering multiple functions in one unit to save time and expense on the overall job.

Another objective of the multi-use two-reservoir bucket is that it can be applied to a method or methods separate or simultaneously for any use making the two-reservoir system more versatile than the typical one-reservoir system.

Still, yet another objective of the multi-use two-reservoir bucket is to supply a pump/sprayer, straining screens, tools and accessories with liquid or material in reservoir one and reservoir two, adding ease and efficiency to a job improving methods, labor, and productivity.

Yet, another primary objective of the multi-use two-reservoir bucket is to make available more options, methods, and uses such as filtering and/or blending while supplying impurity free liquid or material continuously for disbursement. The present invention provides more efficient, easier, faster, and cleaner methods than the conventional ways of filtering, blending, and disbursing in prior art.

Yet, another objective of the multi-use two-reservoir bucket is that while filling or disbursing liquid or material with two reservoirs the pump/sprayer is completely out of the way for a quicker, easier, cleaner pour, unlike using a one-reservoir system. Also, using the two reservoirs with a straining screen eliminates the tedious, time consuming method of filtering each container separately before use and the messy job of ringing out the strainer screen over and over by hand, thus conveniently filtering and blending in one easy sequence creating an impurity free and uniform product for use.

Another objective of the multi-use two reservoir bucket is to use it's rim/channel to hold and utilize a disposable straining screen for filtering liquid or material in reservoir one for use in reservoir two, therefore providing more options of filtering liquid or material. This, in turn, provides another practical way of removing impurities from the liquid or material that will greatly reduce the over all wear and tear and costly repairs on a pump/sprayer.

A further objective of the multi-use two-reservoir bucket is to use two reservoirs for holding more volume of liquid or material for disbursement or storage. While filling, the multi-use two-reservoir bucket's volume is used to blend liquid or material preferably one and a half containers at a time. Unlike a one-reservoir system, the greater volume effectively reduces the frequent refills, labor costs, and greatly improves efficiency of labor and production with less machine maintenance.

An objective of the multi-use two-reservoir bucket's divider is to provide an effective, inexpensive, and efficient device that works with the body to separate and define two-reservoirs and hold a straining screen(s) from entering reservoir two. Also, a divider that is compatible with the preferred embodiment for a sealed fit. A further objective is to provide a divider that is integral or removable for storage, shipping, cleaning, reusability, and/or providing multiple options and uses for the multi-use two-reservoir bucket. Because the divider can be taken apart, it is quickly and easily cleaned and therefore reusable making it superior to any non-detachable divider.

Yet, another objective of the multi-use two-reservoir bucket is to have a polarity of sidewalls that are slightly tapered inward to form a single storage area and a detachable divider to remove for stacking the multi-use two-reservoir bucket into one another for shipping, displaying, and storage. This in turn, reduces freight charges, maximizes shelf space, and offers convenient storage unlike other specialty containers. Also, a detachable divider further provides more convenient and resourceful options and uses for the multi-use two-reservoir bucket.

Yet, a further objective of the multi-use two-reservoir bucket is to have a first set of pivot handles and, to stabilize the weight of the extra volume, the option of using a second set of recessed handles for safely lifting, placing or moving. This improves ease of handling and offers more than one way to carry the bucket improving the difficulties associated with lifting and moving of heavy containers.

One other objective of the multi-use two-reservoir bucket is to provide a reusable means of closure which is difficult for children to remove, yet is user-friendly to senior citizens, and which is designed to securely seal the multi-use two-reservoir bucket so as to prevent loss of its contents. Therefore, another objective of the multi-use two-reservoir bucket is to provide a reusable fit cover that can be repeatedly reapplied to provide a secure closure and seal that prevents loss of the contents from the multi-use two-reservoir bucket. This in turn, makes storing any unused contents more convenient and safe.

The above and other features of the present invention, including various novel details of construction and combinations of parts, will now be more particularly described with reference to the accompanying drawings and pointed out in the claims. It will be understood that the present invention is shown by way of illustration only and not as a limitation of the present invention. The principles and features of the present invention may be employed in various and numerous materials and embodiments without departing from the scope of the invention.

In this respect, before explaining at least one embodiment of the present invention in detail, it is to be understood that the present invention is not limited in its application to the details of construction and to the arrangements of the components set forth in the following description or illustrated in the drawings. The present invention is capable of other embodiments and of being practiced and carried out in various ways. Also, it is to be understood that the phraseology and terminology employed herein are for the purpose of description and should not be regarded as limiting. Reservoir (s) is referred herein and therein after as a place where something is kept in store for usage. The flat region described herein and therein after refers to the bottom area that is shaped to enclose the upward extending sidewalls. There are additional features of the invention that will be described thereinafter and which will form the subject matter of the claims appended hereto.

A BRIEF DESCRIPTION OF THE DRAWINGS

The present invention will be better understood and the objectives of the present invention will become apparent when consideration is given to the following detailed description thereof. Such description makes reference to the annexed drawings wherein:

As best shown FIG. 1 shows a top slant view of the multi-use two-reservoir bucket illustrating the components that make up the preferred embodiments.

Figure 2:
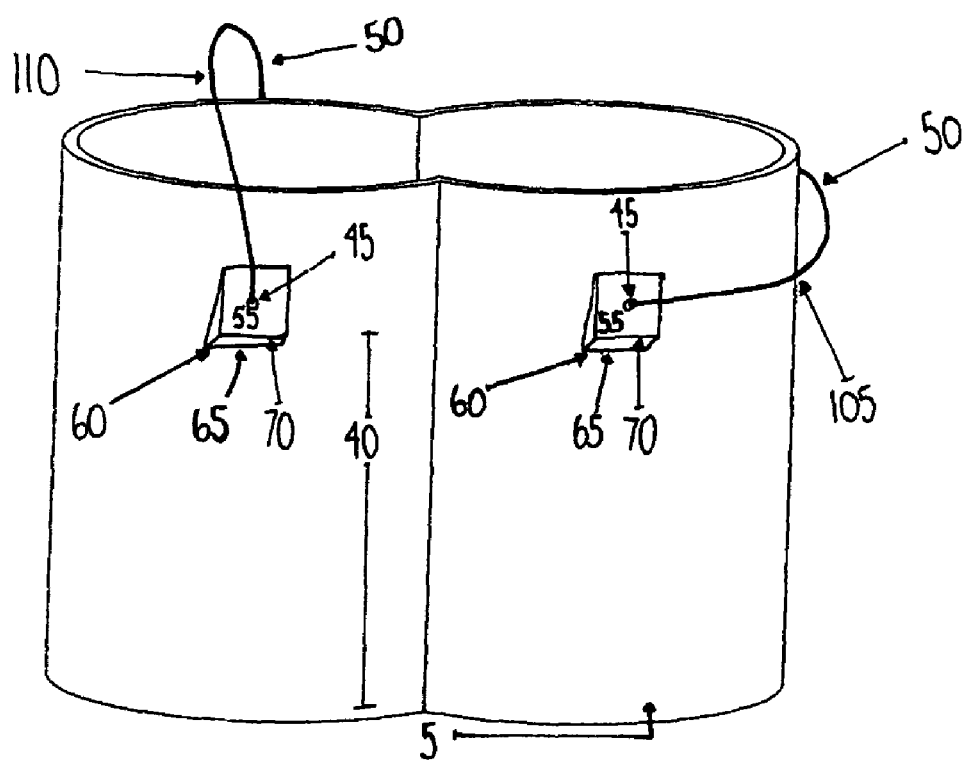

As best shown FIG. 2 shows a side slant view of the multi-use two-reservoir bucket illustrating the components that make up the preferred embodiments.

Figure 3:
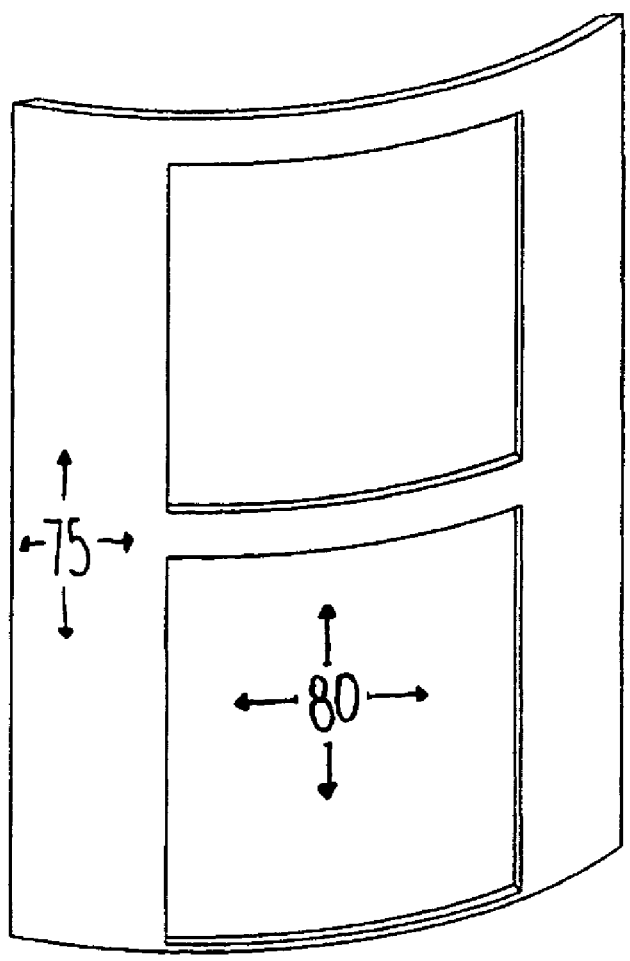

As best shown FIG. 3 shows a front slant view of the multi-use two-reservoir bucket's integral or removable divider illustrating the components that make up the preferred embodiments.

Figure 4:
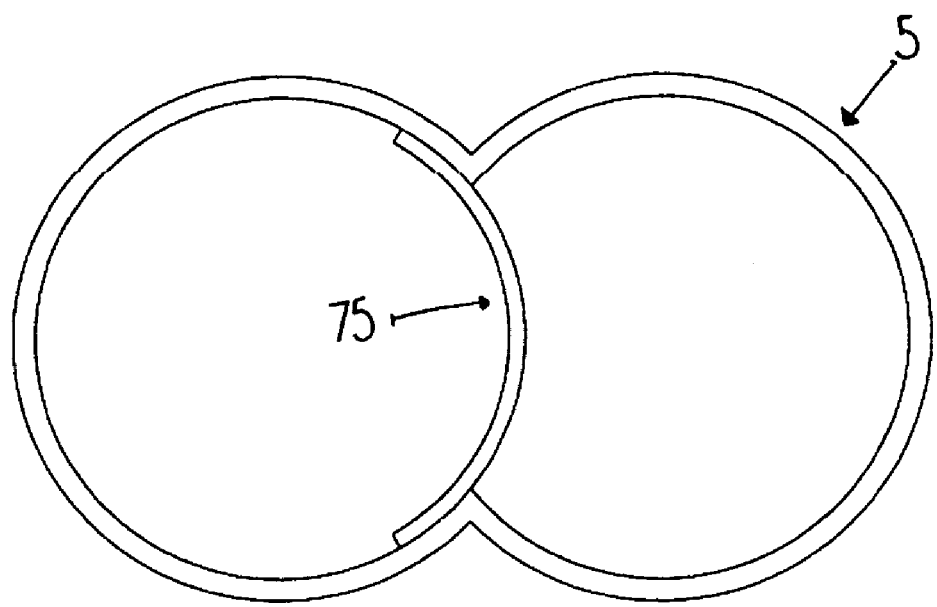

As best shown FIG. 4 shows a top view of the body and divider illustrating the components that make up the preferred embodiments conformed into a sealed fit separating and defining the two reservoirs.

Figure 5:
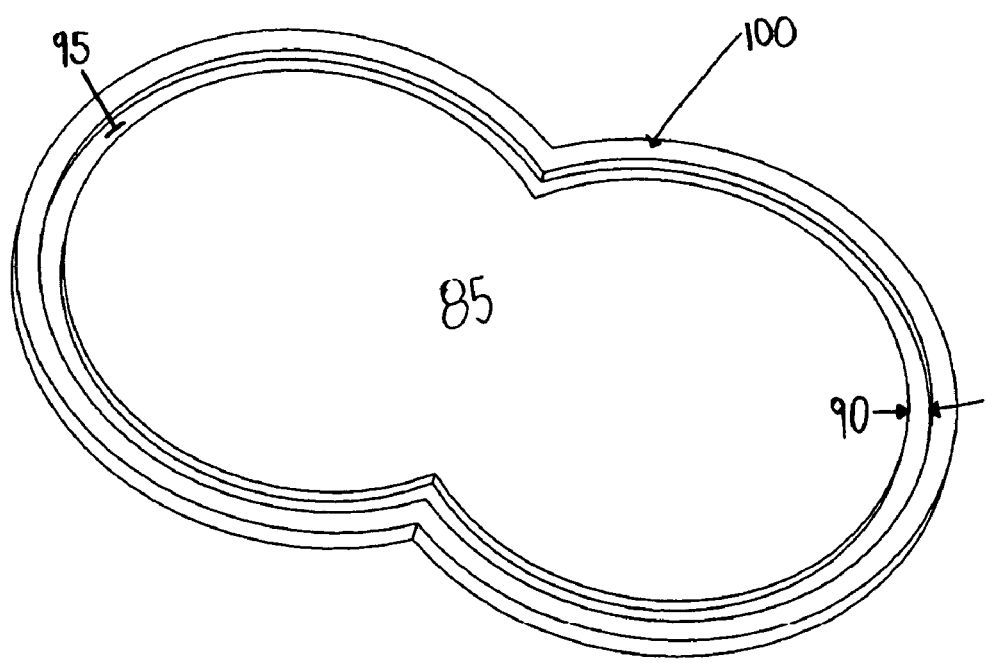

As best shown FIG. 5 shows a bottom slant view of the multi use two-reservoir bucket's attachable fit cover illustrating the components that make up the preferred embodiments.

Figure 6:
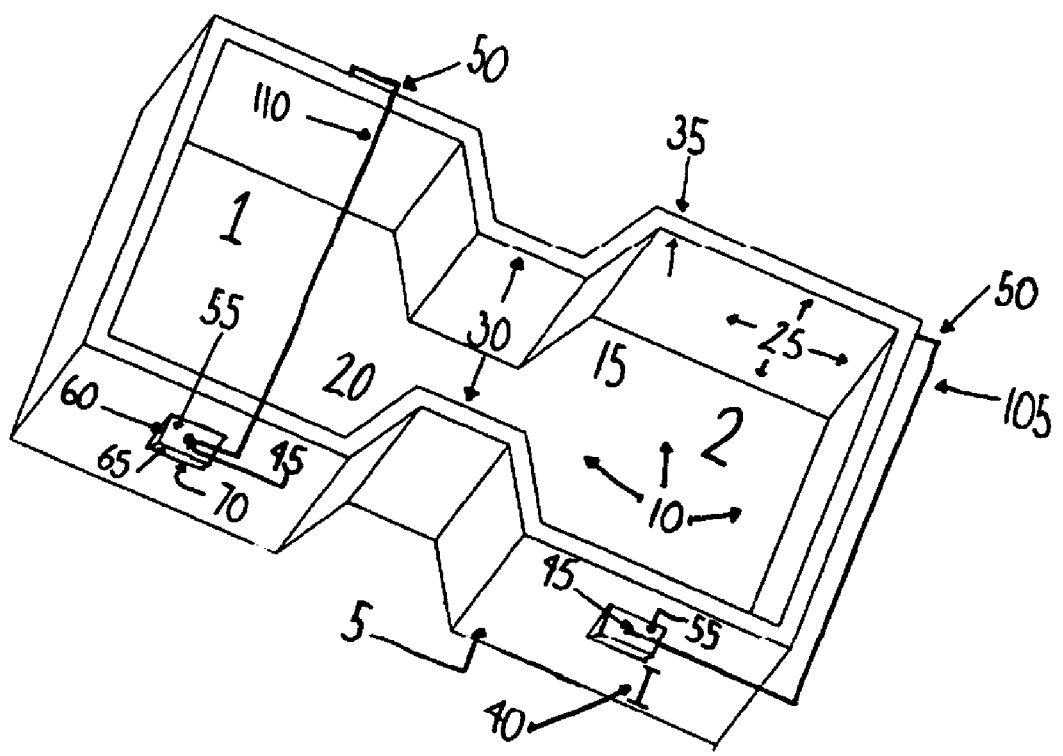

As best shown FIG. 6 shows a top slant view of another embodiment of the multi-use two reservoir bucket.

Figure 7:
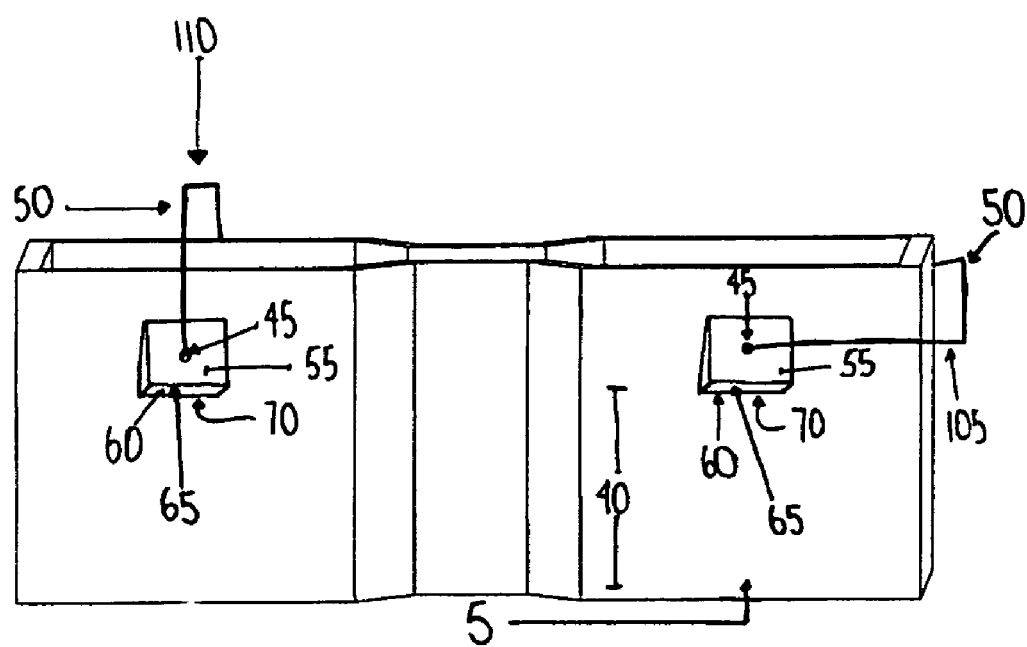

As best shown FIG. 7 shows a side slant view of the embodiment of FIG. 6.

Figure 8:
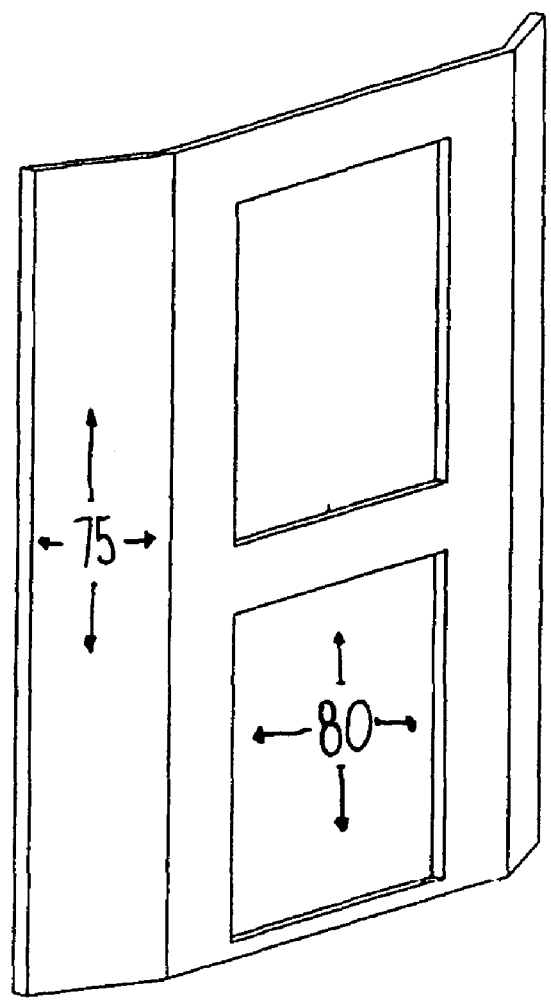

As best shown FIG. 8 shows a front slant view of the divider of the embodiment of FIG. 6.

Figure 9:
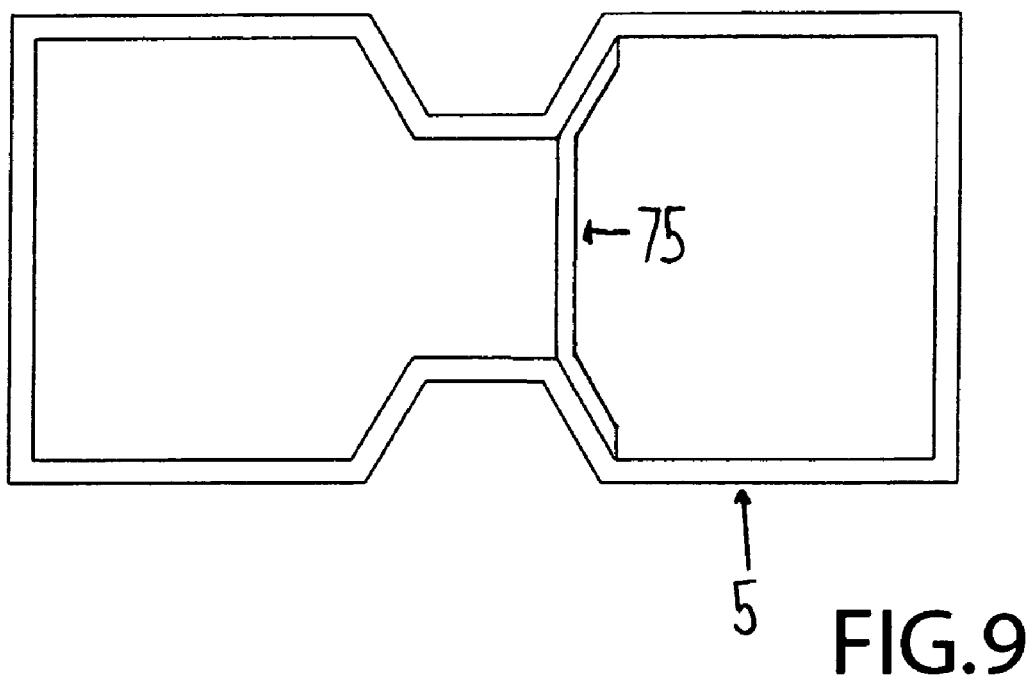

As best shown FIG. 9 shows a top view of the embodiment of FIG. 6 with the divider inserted.

Figure 10:
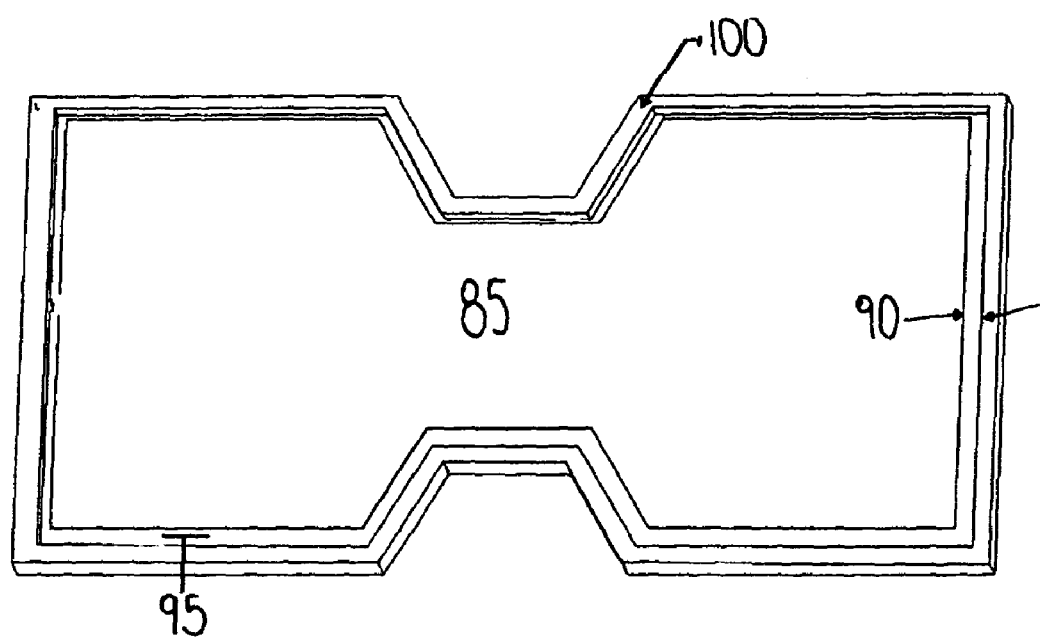

As best shown FIG. 10 shows a bottom slant view of the cover of the embodiment of FIG. 6.

Figure 11:
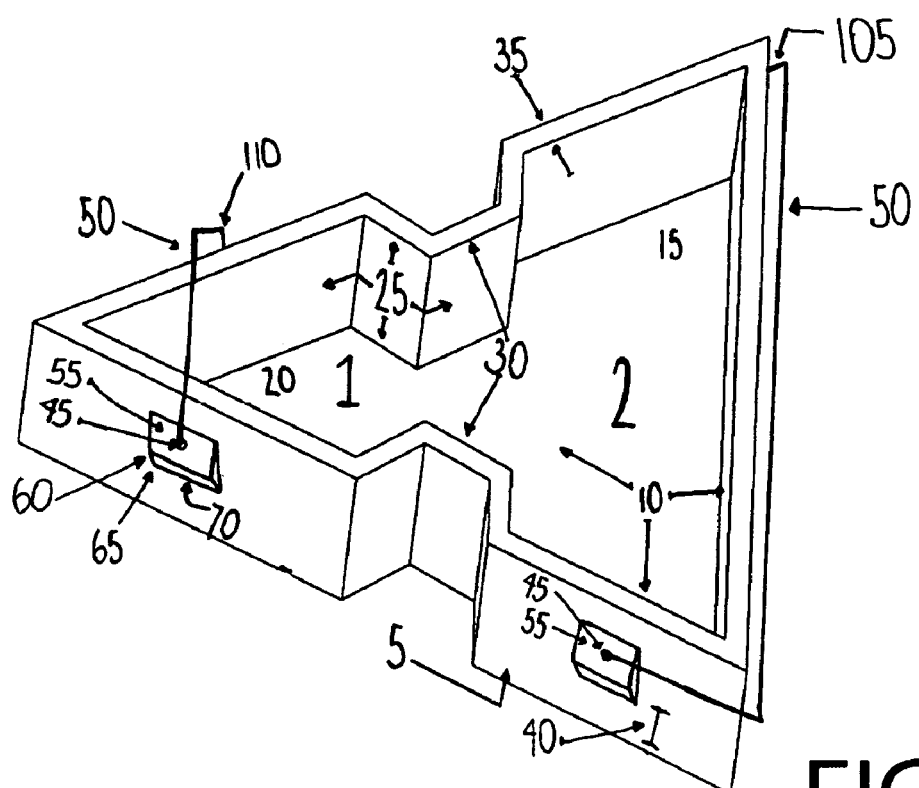

As best shown FIG. 11 shows a top slant view of another embodiment of the multi-use two reservoir bucket.

Figure 12:
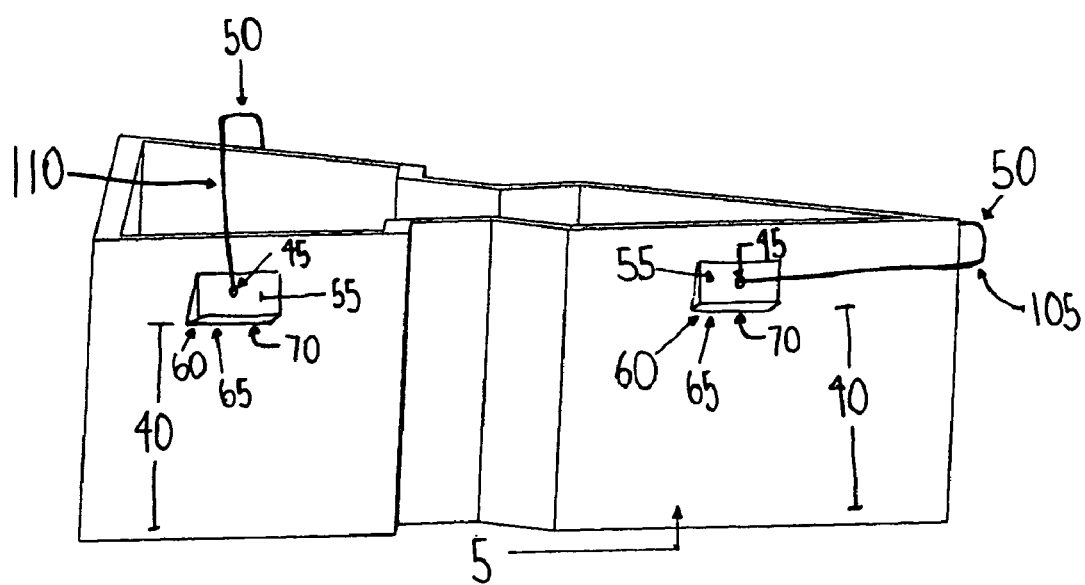

As best shown FIG. 12 shows a side slant view of the embodiment of FIG. 11.

Figure 13:
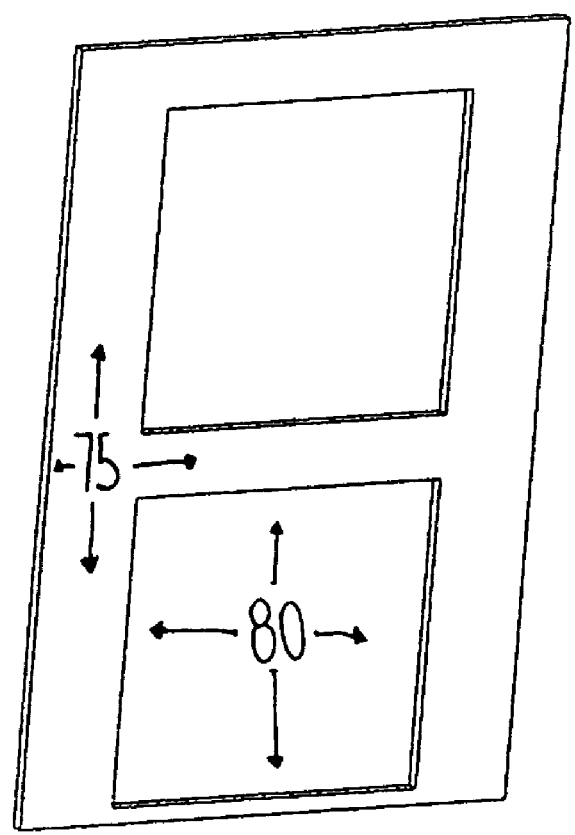

As best shown FIG. 13 shows a front slant view of the divider of the embodiment of FIG. 11.

Figure 14:
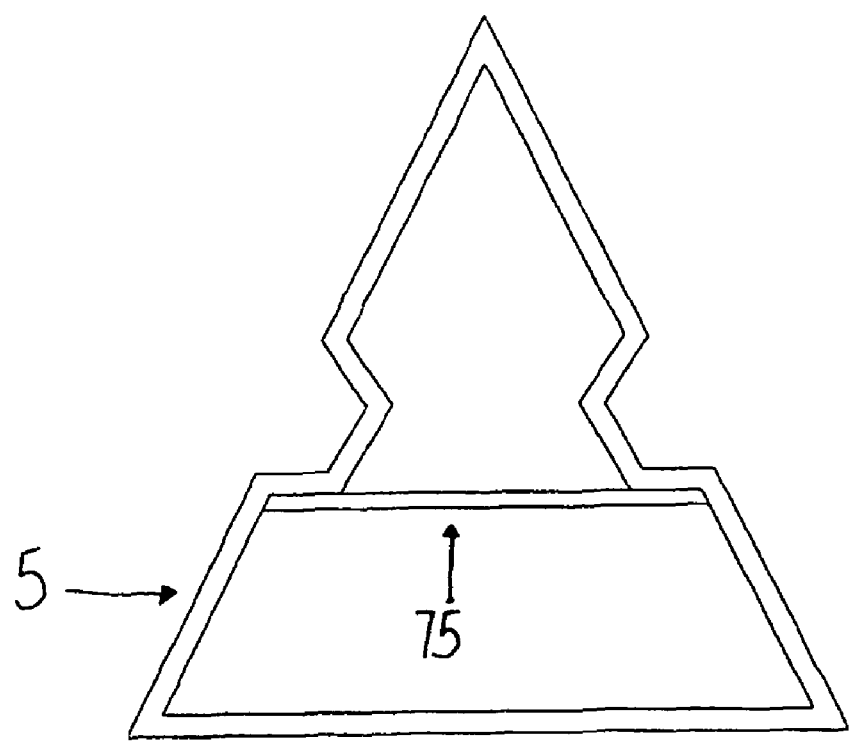

As best shown FIG. 14 shows a top view of the embodiment of FIG. 11 with the divider inserted.

Figure 15:
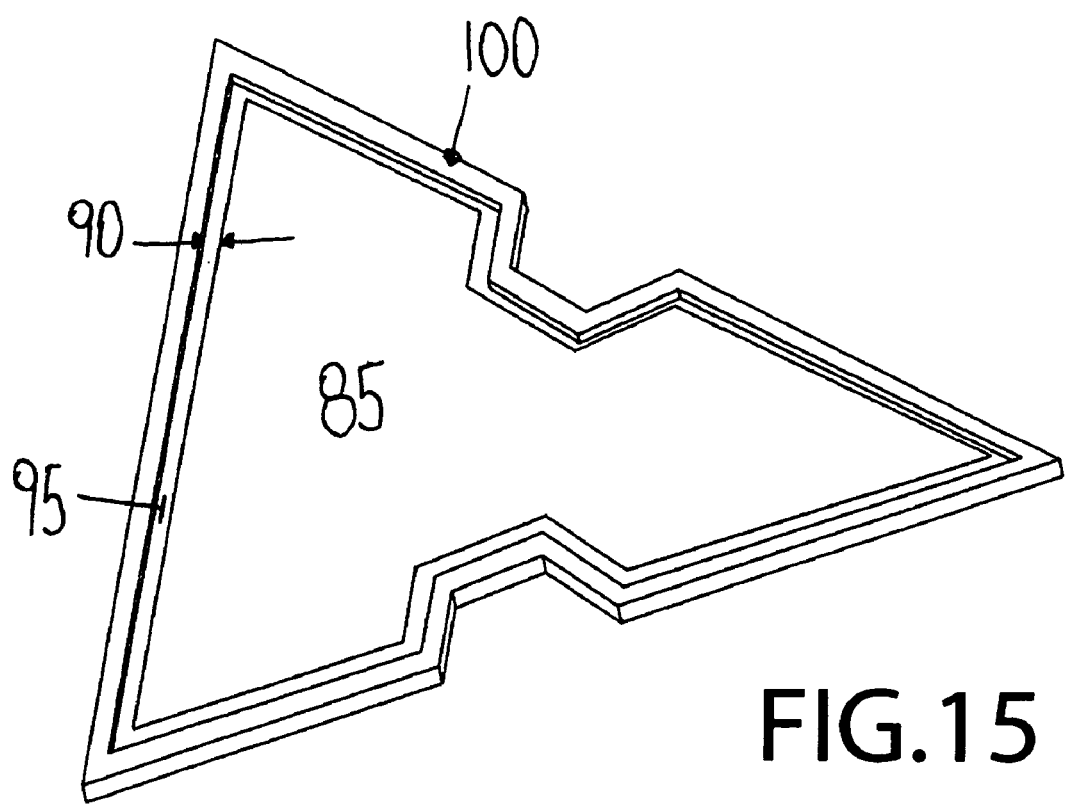

As best shown FIG. 15 shows a bottom slant view of the cover of the embodiment of FIG. 11.

DETAILED DESCRIPTION OF THE INVENTION

Overview
More Specifically

A multi-use two-reservoir bucket comprised of conjoint reservoirs, the sidewalls of each reservoir intersecting the sidewalls of the other reservoir in such a way as to provide a narrowed open channel extending, from top to bottom between the two reservoirs, themselves selectively divided from each other at the open channel by an integral or removable divider with passageway(s); and, the aforesaid two-reservoir bucket further having an open top; a continuous closed bottom; a rim configuration suitable to receive a closed attachable fit cover to seal one or both reservoirs, and appropriate pivot handle supports. More over, the two-reservoirs constitute separated shapes joined at the narrowed open channel.

In Combination

The multi-use two-reservoir bucket comprising in combination: (1) of conjoint reservoirs, the sidewalls of each reservoir intersecting the sidewalls of the other reservoir in such a way as to provide a narrowed open channel extending from top to bottom between the two reservoirs, themselves selectively divided from each other at the open channel by an integral or removable divider with passageway(s); and, the aforesaid two-reservoir bucket further having an open top; a continuous closed bottom; a rim configuration suitable to receive a closed attachable fit cover to seal one or both reservoirs; appropriate pivot handle supports; and, (2) the conforming non-planar integral or removable divider provided with passageway(s) partitions the aforementioned two reservoir bucket into subsidiary reservoirs; and, (3) an attachable fit cover suitable for a closure means with the aforementioned rim configuration.

Body

As best shown FIG. 1 shows a top slant view of the multi-use two-reservoir bucket comprising of: the body 5 that forms a single storage area; an open top 10; a closed bottom 15; a flat region 20; a plurality of upward extending sidewalls 25 that shape two reservoirs, 1 and 2; an open channel 30 connecting the reservoirs for receiving and/or conforming to a divider; a rim/channel 35; an inward tapered region 40; pivot supports 45; a first set of handles 50; a second set of recessed handles 55; having an inserted area 60 under the pivot supports 65 that provide finger grip access located therein 70; position 105 shows when the handles 50 are extended downward; position 110 shows when the handles 50 are pivoted upward.

As best shown FIG. 2 shows a side slant view of the multi-use two-reservoir bucket comprising of: a body 5; an inward tapered region 40; pivot supports 45; a first set of handles 50; a second set of recessed handles 55; having an inserted area 60 under the pivot supports 65 that provide finger grip access located therein 70; position 105 shows when the handles 50 are extended downward; position 110 shows when the handles 50 are pivoted upward.

Divider

As best shown FIG. 3 shows a front slant view of the multi-use two-reservoir bucket's integral or removable divider 75 comprising of passageway(s) 80 that separates and defines the two reservoirs.

Body and Divider

As best shown FIG. 4 shows a top view of the body and divider comprising of the body 5 and divider 75 conformed into a sealed fit separating and defining the two reservoirs.

Fit Cover

As best shown FIG. 5 shows a bottom slant view of the multi use two-reservoir bucket's attachable fit cover comprising of: the attachable fit cover 85 comprising of a mouth 90, a groove 95, and a lip extension 100.

In Combination Overview of: FIG. 1, FIG. 2, FIG. 3, FIG. 4, and FIG. 5

A multi-use two-reservoir bucket 5 comprised of conjoint reservoirs 1 and 2, the sidewalls 25 of each reservoir bend inward to intersect the sidewalls of the other reservoir in such a way as to form an indentation so as to provide a narrowed open channel 30 extending from top 10 to bottom 15 between the two reservoirs, themselves selectively divided from each other at the open channel 30 by an integral or removable divider 75 with passageway(s) 80; and, the aforesaid two-reservoir bucket 5 further having a top 10 that is open; a continuous bottom 15 that is closed; a rim configuration 35 suitable to receive a closed attachable fit cover to seal one or both reservoirs; and appropriate pivot handle supports; and, (2) the conforming non-planar integral or removable divider 75 provided with passageway(s) 80 partitions the aforementioned two reservoir bucket into subsidiary reservoirs; and, (3) an attachable fit cover 85 suitable for a closure means with the aforementioned rim configuration 35.

Preferred Method of Manufacture

In FIGS. 1 and 2 the multi-use two-reservoir bucket's body 5, in FIG. 3 the divider 75, in FIG. 5 the fit cover 85 are preferably injection molded plastic by the injection mold process. The most preferred materials of construction are high-density polyethylene and polypropylene.

In FIG. 3 the multi-use two-reservoir bucket's divider 75 is manufactured to be integral or removable to provide a conformed and sealed fit with the preferred embodiment.

In FIGS. 1 and 2 the multi-use two-reservoir bucket's first set of handles 50 comprised of thin curved bail wire that pivots and is pivotally attached to the pivot supports 45.

In FIGS. 1 and 2 the multi-use two-reservoir bucket's pivot supports 45 and second set of recessed handles 55 are formed in or attached, which is manufactured preferably from plastic in one piece such as by a molding process.

In FIG. 5 the mouth 90 and groove 95 which is manufactured preferably from plastic in one piece such as by a molding process and is engineered to provide a continuous seal and releasable leak proof interlock with in FIG. 1 the rim/channel 35 when they are mated together.

Preferred Methods of Use

With further reference now to the drawings, and in particular to FIGS. 1 through 5, also FIGS. 6 through 15 thereof, the principles of the multi-use two-reservoir bucket is to use reservoir 1 for method(s) and use reservoir 2 for method(s) using two reservoirs for combining methods for a pump/sprayer, straining screens, tools and accessories. The multi-use two-reservoir bucket can apply a method or methods separate or simultaneously for any use, this in turn, makes available more options, methods, and uses such as filtering and supplying liquid or material continuously, supplying more volume, or blending and/or filtering for disbursement or storage. The two reservoirs, 1 and 2, are for holding liquid or material for disbursement or storage and are integrally formed as a one-piece container and form a single storage area within the multi-use two-reservoir bucket's body 5. The rim/channel 35 is used for holding a straining screen in reservoir 1 for filtering liquid or material into reservoir 2 providing more uses and options of filtering liquid or material. The multi-use two-reservoir bucket is a two-reservoir system to supply liquid or material to a pump/sprayer in reservoir 2 and use a straining screen to filter liquid or material in reservoir 1 for use in reservoir 2, using reservoir 1 for filtering and using reservoir 2 for disbursement, filtering liquid or material when liquid or material flows from one reservoir to the other reservoir while filling or disbursing. The multi-use two-reservoir bucket's body 5 and divider 75 in FIG. 4 are used to filter impurities from liquid or material by gravity passing the liquid or material from reservoir 1 through a utilized straining screen into reservoir 2 providing an impurity free continual disbursement therefore, a straining screen is used in one reservoir for filtering liquid or material in the second reservoir. Gravity, supply and/or disbursement flows the liquid or material from one reservoir through the open channel 30 to the other reservoir. The open channel 30 is also adaptable for divider screens. The multi-use two-reservoir bucket's reservoir 1 and reservoir 2 provide and hold more volume of liquid or material for disbursement. While filling, the multi-use two-reservoir bucket's volume is used to blend liquid or material most preferably one and a half containers at a time for disbursing. The multi-use two-reservoir bucket is for use with pump/sprayers, straining screens, tools and accessories. The integral or removable divider 75 works with the body 5 and conforms into a sealed fit as in FIG. 4. The divider 75 separates and defines the two reservoirs, 1 and 2. The divider 75 is integral or removable for storage, shipping, cleaning, reusability and/or providing more options and uses for the multi-use two-reservoir bucket. The divider 75 holds a straining screen from entering the second reservoir while the straining screen vertically filters impurities from liquid or material. The divider 75 is adaptable and compatible with the preferred embodiment for a conformed and sealed fit. The divider's passageway(s) 80 allow liquid or material to pass freely between reservoirs. The first set of handles 50 comprising of a bail wire is pivotally attached to the pivot supports 45 on a plurality of sidewalls 25 at two pivot points. When the handles 50 are extended downward this would positively engage the outside of the sidewalls showing position 105. Position 110 shows when the handles 50 are pivoted upward. To pour liquid or material, hold the handles together, lift, and pivot the multi-use two-reservoir bucket's body 5 and/or divider 75. The second set of recessed handles 55 are attached or formed to the main body utilizing space under the pivot supports 65 for receiving human fingers. The second set of recessed handles 55 is formed under the pivot supports 45 onto one or more of the plurality of sidewalls 25 has an inserted area 60 for finger grip access located therein 70. The multi-use two-reservoir bucket's body 5 further includes an inward tapered region 40 and is configured to permit the containers to be stacked vertically in a nested fashion. The inward tapered region 40 may be a predetermined distance between the bottom 15 and the pivot supports 45; in this manner the pivot supports 45 would rest on the top of the other rim/channel when nested together. The inward tapered region 40 may have any orientation in order to facilitate removing the multi-use two-reservoir bucket from a lower stacked container. An attachable fit cover 85 when pressed into its closed position is for safely storing any contents. The attachable fit cover's mouth 90, groove 95, and the rim/channel 35 include portions providing a continuous seal and releasable leak proof interlock when the rim/channel 35 is seated through the mouth 90 into the groove 95 and the attachable fit cover 85 is pressed into its closed position. Place fingers under the lip extension 100 and pry upward to open. The lip extension 100 is stiff and hard for children to open, yet flexible enough for seniors to easily open.

Therefore, the forgoing is considered as illustrative only of the principles of the present invention. Further, since numerous modifications and changes will readily occur to those skilled in the art, it is not desired to limit the present invention to the exact construction and operation shown and described, and accordingly, all suitable modifications and equivalents may be resorted to falling within the scope of the invention.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Variations

As best shown FIG. 6 shows a top slant view of a multi-use two-reservoir bucket that works in the same manner as the multi-use two-reservoir bucket in FIG. 1 with a body 5 that forms a single storage area; an open top 10; a closed bottom 15; a flat region 20; a plurality of upward extending sidewalls 25 that shape two reservoirs, 1 and 2; an open channel 30 connecting the reservoirs for receiving and/or conforming to a divider; a rim/channel 35; an inward tapered region 40; pivot supports 45; a first set of handles 50; a second set of recessed handles 55 having an inserted area 60 under the pivot supports 65 that provide finger grip access located therein 70; position 105 shows when the handles 50 are extended downward; position 110 shows when the handles 50 are pivoted upward.

As best shown FIG. 7 shows a side slant view of a multi-use two-reservoir bucket that works in the same manner as the multi-use two-reservoir bucket in FIG. 2 with a body 5; pivot supports 45; a first set of handles 50; a second set of recessed handles 55 having an inserted area 60 under the pivot supports 65 that provide finger grip access located therein 70; position 105 shows when the handles 50 are extended downward; position 110 shows when the handles 50 are pivoted upward.

As best shown FIG. 8 shows a front slant view of a multi-use two-reservoir bucket's integral or removable divider that works in the same manner as the integral or removable divider in FIG. 3 with an integral or removable divider 75 comprising of passageway(s) 80 that separates and defines the two reservoirs and is compatible with the preferred embodiment for a sealed fit.

As best shown FIG. 9 shows a top view of a body and divider that works in the same manner as the body and divider in FIG. 4 with a body 5 and divider 75 conformed into a sealed fit separating and defining the two reservoirs.

As best shown FIG. 10 shows a bottom slant view of a multi use two-reservoir bucket's attachable fit cover that works in the same manner as the multi-use two-reservoir bucket's attachable fit cover in FIG. 5 with a attachable fit cover 85 comprising of a mouth 90, a groove 95, and a lip extension 100.

As best shown FIG. 11 shows a top slant view of a multi-use two-reservoir bucket that works in the same manner as the multi-use two-reservoir bucket in FIG. 1 with a body 5 that forms a single storage area; an open top 10; a closed bottom 15; a flat region 20; a plurality of upward extending sidewalls 25 that shape two reservoirs, 1 and 2; an open channel 30 connecting the reservoirs for receiving and/or conforming to a divider; a rim/channel 35; an inward tapered region 40; pivot supports 45; a first set of handles 50; a second set of recessed handles 55 having an inserted area 60 under the pivot supports 65 that provide finger grip access located therein 70; position 105 shows when the handles 50 are extended downward; position 110 shows when the handles 50 are pivoted upward.

As best shown FIG. 12 shows a side slant view of a multi-use two-reservoir bucket that works in the same manner as the multi-use two-reservoir bucket in FIG. 2 with a body 5; pivot supports 45; a first set of handles 50; a second set of recessed handles 55 having an inserted area 60 under the pivot supports 65 that provide finger grip access located therein 70; position 105 shows when the handles 50 are extended downward; position 110 shows when the handles 50 are pivoted upward.

As best shown FIG. 13 shows a front slant view of a multi-use two-reservoir bucket's integral or removable divider that works in the same manner as the integral or removable divider in FIG. 3 with an integral or removable divider 75 comprising of passageway(s) 80 that separates and defines the two reservoirs and is compatible with the preferred embodiment for a sealed fit.

As best shown FIG. 14 shows a top view of a body and divider that works in the same manner as the body and divider in FIG. 4 with a body 5 and divider 75 conformed into a sealed fit separating and defining the two reservoirs.

As best shown FIG. 15 shows a bottom slant view of a multi use two-reservoir bucket's attachable fit cover that works in the same manner as the multi-use two-reservoir bucket's attachable fit cover in FIG. 5 with a attachable fit cover 85 comprising of a mouth 90, a groove 95, and a lip extension 100.

The invention claimed is:

1. A multi-use two-reservoir bucket comprised of conjoint reservoirs, the sidewalls of each reservoir bend inward to intersect the sidewalls of the other reservoir in such a way as to form an indentation so as to provide a narrowed open channel extending from top to bottom between the two reservoirs, themselves selectively divided from each other at the open channel by an integral or removable divider with passageway(s); and, the aforesaid two-reservoir bucket further having an open top; a continuous closed bottom; a rim configuration suitable to receive a closed attachable fit cover to seal one or both reservoirs, and appropriate pivot handle supports.

2. The two-reservoirs of claim 1 wherein the two-reservoirs constitute separated shapes joined at the narrowed open channel.

3. A multi-use two-reservoir bucket comprising in combination: (1) of conjoint reservoirs, the sidewalls of each reservoir bend inward to intersect the sidewalls of the other reservoir in such a way as to form an indentation so as to provide a narrowed open channel extending from top to bottom between the two reservoirs, themselves selectively divided from each other at the open channel by an integral or removable divider with passageway(s); and, the aforesaid two-reservoir bucket further having an open top; a continuous closed bottom; a rim configuration suitable to receive a closed attachable fit cover to seal one or both reservoirs; appropriate pivot handle supports; and, (2) the conforming non-planar integral or removable divider provided with passageway(s) partitions the aforementioned two reservoir bucket into subsidiary reservoirs; and, (3) an attachable fit cover suitable for a closure means with the aforementioned rim configuration.

* * * * *